Patented Jan. 6, 1942

2,268,936

UNITED STATES PATENT OFFICE 2,268,936

AZO DYESTUFFS AND THEIR MANUFACTURE

Armin Hasler and Achille Conzetti, Basel, and Adolf Krebser, Riehen, near Basel, Switzerland, assignors to the firm J. R. Geigy A. G., Basel, Switzerland No Drawing. Application November 24, 1939, Serial No. 306,030. In Switzerland December 2, 1938

8 Claims. (Cl. 260—200)

It has been found that very valuable monoazodyestuffs of the o,o'-dihydroxyazo series can be obtained by coupling o-hydroxydiazonium compounds of the benzene series with 1-hydroxynaphthalene-8-sulphonic acids of the following general formula:

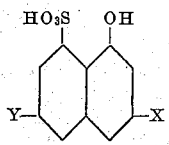

wherein X means a sulphamide group twice substituted at the nitrogen by aliphatic and/or aromatic radicals or an arylsulphone group, and Y means hydrogen or the same groups at X.

The thus obtained monoazodyestuffs may, if desired, be treated on the fibre or in substance with metal yielding means. Thus, metal containing dyestuffs are obtained, which particularly show a good equalizing power and a great purity of their shades with good fastness properties to light and milling.

Similar dyestuffs with 1-hydroxy-naphthalene-8-sulphonic-acid - 4 - sulphamides as coupling components are known by the British Patent No. 439,451. The new dyestuffs, obtained according to the present invention generally possess the same remarkable properties, as they are indicated in the said patent for the mentioned known dyestuffs, but beyond this the new dyestuffs show an extremely important, considerable shifting of the shade to the green side of the spectrum and generally an improvement of the fastness to light. With respect to the dyestuffs with unsubstituted 1-hydroxy-naphthalene-3.8- and -4.8-disulphonic acids as coupling component the new dyestuffs have a superior equalizing power and the shades generally possess a better fastness to milling.

The new azo components may be obtained, according to well-known methods, from 1.8-naphthsultone-3-sulphochloride or - 3.6 - disulphochloride by condensation with secondary amines or e. g. with benzenehydrocarbons according to Friedel-Crafts or to other usual methods for producing sulphones. The following table shows some of the new naphthsultone derivatives characterized by their melting points:

| | Melting point, °C. |
|---|---|
| 1.8-naphthsultone-3-sulphethyl-anilide | 199–200 |
| 1.8-naphthsultone-3-sulphodiethylamide | 180–181 |
| 1.8-naphthsultone-3-phenylsulphone | 214–215 |
| 1.8-naphthsultone-3.6-disulphethylanilide | 205–206 |
| 1.8-naphthsultone-3.6 - disulphodiethylamide | 183–184 |
| 1.8-naphthsultone-3.6 - disulphodimethylamide | 240–241 |

By opening the sultone bridge with alkalies the corresponding 1-hydroxynaphthalene-8-sulphonic acid derivatives are obtained. Their behaviour with regard to their coupling capacity is wholly different from the 1-hydroxynaphthalene-8-sulphonic acid-4-sulphamides claimed in the British Patent No. 439,451. For example they can no more be combined with diazotized o-amino-naphthol-sulphonic acids, neither with diluted alkalies such as indicated in Example 1 of the British Patent No. 439,451, nor with concentrated alkalies and differ also in this respect from the known 1-hydroxynaphthalene-4.8- and -3.8-disulphamides.

The following examples illustrate the invention, the parts being by weight.

Example 1

15.4 parts of 5-nitraminophenol are diazotized according to the known method with 7 parts of sodium nitrite. The diazonium solution is combined with an aqueous solution of 36.4 parts of 1-hydroxynaphthalene-3-phenylsulphone-8-sulphonic acid, 4 parts of caustic soda lye of 100 per cent strength, 12 parts of sodium carbonate and 100 parts of pyridine. The coupling is completed in a short time. The new dyestuff, a dark bronzing powder, dissolves in water with blue coloration, in concentrated sulphuric acid with red coloration and dyes wool after-chromed pure greenish-blue shades of good fastness properties.

Similar dyestuffs are obtained when using 1-hydroxynaphthalene-3-sulphonic acid - diethylor dimethylamide-8-sulphonic acid instead of the 1-hydroxynaphthalene-3-phenylsulphone-8-sulphonic acid, or also the corresponding 3-tolylsulphone-8-sulphonic acid.

Example 2

30.8 parts of 5-nitraminophenol are, as usual, diazotized, the diazo solution is treated with 16 parts of sodium bicarbonate until it shows a feeble acid reaction to congo, and the product is coupled with a solution of 81.4 parts of 1-hydroxynaphthalene-3-sulphethyl- or -methylanilide-8-sulphonic acid and 30 parts of sodium carbonate in presence of 50 parts of pyridine. The formation of the dyestuff being completed, the dyestuff can be directly filtered. It constitutes a dark blue powder, which is soluble in water with pure blue coloration. It dyes wool afterchromed blue shades of very good fastness to milling and potting.

When being transformed according to wellknown methods into the corresponding chromium compound, the new dyestuff dyes wool in an acid bath fast, blue shades.

Example 3

22.4 parts of 4-chloro-2-aminophenol-6-sulphonic acid are diazotized according to the known method; the diazonium compound is coupled with an aqueous solution of 40.7 parts of 1-hydroxynaphthalene - 3 - sulphethylanilide - 8 - sulphonic acid containing 4 parts of caustic soda lye of 100 per cent strength, ammonia in excess and 100 parts of pyridine. The combination being completed, the dyestuff is precipitated by addition of hydrochloric acid, then filtered and dried. It constitutes a dark bronzing powder, which dissolves in water with a reddish-blue coloration and in concentrated sulphuric acid with a bluish-red coloration and which dyes wool after-chromed navy-blue shades.

Example 4

30.8 parts of 5-nitraminophenol are, as usual, diazotized and the diazonium solution, after making feebly acid to congo by addition of 16 parts of sodium bicarbonate, is coupled with an ice-cold solution of 114.4 parts of 1-hydroxynaphthalene - 3.6 - disulphethylanilide - 8 - sulphonic acid containing 30 parts of sodium carbonate and 50 parts of pyridine. The formation of the dyestuff being completed, the dyestuff is fully precipitated out with a small quantity of a common salt solution and filtered off. The dry dyestuff, a dark blue powder, dissolves in water with a greenish-blue coloration and dyes wool after-chromed greenish-blue shades of a very good fastness to milling and potting. Also according the one-bath process with sodium chromate beautiful blue shades are obtained.

What we claim is:

1. The o,o'-dihydroxyazodyestuffs of the formula

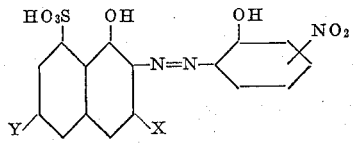

wherein X means a member of the group consisting of a sulphamide group twice substituted at the nitrogen by a member of the group consisting of alkyl and phenyl radicals, and phenylsulphone group, and Y means one member of the group consisting of hydrogen and the same groups as X, said coupling products, when treated with metal yielding agents, constituting dyestuffs having a good equalizing power and giving very pure dyeings of good fastness to light and milling.

2. The o,o'-dihydroxyazodyestuff of the formula

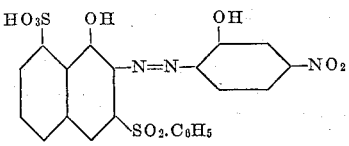

being when chromed a valuable greenish-blue wool dyestuff of good fastness properties.

3. The o,o'-dihydroxyazodyestuffs of the formula

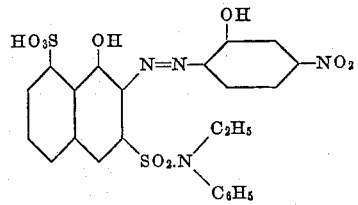

being when chromed a valuable blue wool dyestuff of good fastness properties.

4. The o,o'-dihydroxyazodyestuff of the formula

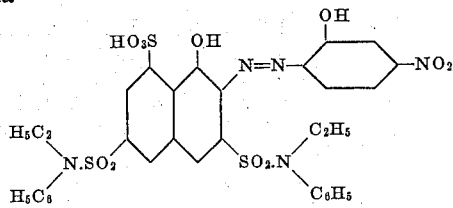

being when chromed a valuable greenish-blue wool dyestuff of good fastness properties.

5. A process for the manufacture of azodyestuffs of the o,o'-dihydroxyazo series, comprising coupling a diazotized nitraminophenol with a 1-hydroxynaphthalene-8-sulphonic acid derivative of the formula

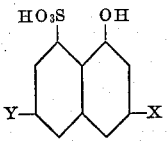

wherein X means a member of the group consisting of a sulphamide group twice substituted at the nitrogen by a member of the group consisting of alkyl and phenyl radicals, and phenylsulphone group, and Y means one member of the group consisting of hydrogen and the same groups as X.

6. A process for the manufacture of azo dyestuffs of the o,o'-dihydroxyazo series, comprising coupling diazotized 5-nitraminophenol with 1-hydroxynaphthalene - 3 - phenylsulphone - 8 - sulphonic acid in alkaline solution.

7. A process for the manufacture of azo dyestuffs of the o,o'-dihydroxyazo series, comprising coupling diazotized 5-nitraminophenol with 1-hydroxynaphthalene - 3 - sulphethylanilide - 8-sulphonic acid in alkaline solution.

8. A process for the manufacture of azo dyestuffs of the o,o'-dihydroxyazo series, comprising coupling diazotized 5-nitraminophenol with 1 - hydroxynaphthalene - 3.6 - disulphethylanilide-8-sulphonic acid in alkaline solution.

ARMIN HASLER.
ACHILLE CONZETTI.
ADOLF KREBSER.